United States Patent
Yeh et al.

(10) Patent No.: US 10,042,444 B2
(45) Date of Patent: Aug. 7, 2018

(54) CAPACITIVE STYLUS WITH TWO TRANSMIT ELECTRODES

(71) Applicant: WALTOP INTERNATIONAL CORPORATION, Hsinchu (TW)

(72) Inventors: Chia-Jui Yeh, Taipei (TW); Yi-Chih Chang, Hsinchu (TW)

(73) Assignee: Waltop International Corporation, Hsinchu (TW)

( * ) Notice: Subject to any disclaimer, the term of this patent is extended or adjusted under 35 U.S.C. 154(b) by 5 days.

(21) Appl. No.: 15/382,230

(22) Filed: Dec. 16, 2016

(65) Prior Publication Data

US 2018/0120958 A1    May 3, 2018

(30) Foreign Application Priority Data

Oct. 28, 2016   (TW) .............................. 105135150 A

(51) Int. Cl.
*G06F 3/0354*   (2013.01)
*G06F 3/038*   (2013.01)

(52) U.S. Cl.
CPC ........ *G06F 3/0383* (2013.01); *G06F 3/03545* (2013.01)

(58) Field of Classification Search
CPC ...... G06F 3/0317; G06F 3/0321; G06F 3/033; G06F 3/03542; G06F 3/03545–3/03546; G06F 3/037; G06F 3/0386; G06F 1/1684; G06F 3/0383

See application file for complete search history.

(56) References Cited

U.S. PATENT DOCUMENTS

| | | | |
|---|---|---|---|
| 9,513,719 B2 * | 12/2016 | Ito | G06F 3/044 |
| 9,665,188 B2 * | 5/2017 | Ogata | G06F 3/03545 |
| 2015/0309598 A1 * | 10/2015 | Zeliff | G06F 3/044 345/179 |
| 2016/0062490 A1 * | 3/2016 | Ogata | G06F 3/038 345/179 |
| 2017/0285772 A1 * | 10/2017 | Yamamoto | G06F 3/0383 |

\* cited by examiner

*Primary Examiner* — Gene W Lee
(74) *Attorney, Agent, or Firm* — Donald E. Stout; Stout, Uxa & Buyan, LLP

(57) ABSTRACT

A capacitive stylus with two transmit electrodes is disclosed. The two transmit electrodes are isolated and shielded so that the transmit terminals of the transmit electrodes are spaced with a distance.

11 Claims, 4 Drawing Sheets

US 10,042,444 B2

CAPACITIVE STYLUS WITH TWO TRANSMIT ELECTRODES

CROSS-REFERENCE TO RELATED APPLICATIONS

The entire contents of Taiwan Patent Application No. 105135150, filed on Oct. 28, 2016, from which this application claims priority, are expressly incorporated herein by reference.

1. Field of the Invention

The present invention relates to a capacitive stylus, and more particularly to a capacitive stylus with two transmit electrodes.

2. Description of the Prior Art

Using capacitive stylus to initiate touch input is already mainstream of touch input technology. Users can use capacitive styluses to perform writing input operations or to execute application programs through user interfaces upon a touch panel. A touch panel detects coordinates of a capacitive stylus via capacitive coupling established between detection electrodes of the touch panel and the capacitive stylus when the capacitive stylus approaches or contacts the touch panel. In order to establish capacitive coupling between detection electrodes and the capacitive stylus to obtain the coordinates of the capacitive stylus, the capacitive stylus must receive driving signals from the detection electrodes and output voltage signals to the detection electrodes. In addition to the coordinates of the capacitive stylus, information including incline angle, orientation of the capacitive stylus is crucial data for functions and applications of the capacitive stylus upon the touch panel. The invention provides a capacitive stylus with two transmit electrodes which are configured to increase a distance between transmit terminals of the transmit electrodes so as to increase a distance between signals on a touch panel from the transmit electrodes which is beneficial to calculation of incline angle of the capacitive stylus.

SUMMARY OF THE INVENTION

An object of the present invention is to provide a capacitive stylus with two transmit electrodes comprising a circuit board with a circuit thereon, a first transmit electrode comprising a conductive nib, a second transmit electrode comprising a second transmit electrode ring, and a first transmit electrode shield. The conductive nib electrically connects to the circuit. The second transmit electrode ring surrounds a first end of the first transmit electrode opposing to a tip of the conductive nib. The second transmit electrode ring electrically connects to the circuit. The first transmit electrode shield is configured to be located between the first transmit electrode and the second transmit electrode. The first transmit electrode shield sheaths a portion of the first transmit electrode to shield the first transmit electrode so that only a second end of the first transmit electrode adjacent the tip of the conductive nib exposes and the second end of the first transmit electrode and the second transmit electrode is spaced with a distance.

In one embodiment of the present invention, the capacitive stylus with two transmit electrodes comprises a circuit board with a circuit thereon, a first transmit electrode comprising a conductive nib, a nib holder and a conductive spring, a second transmit electrode comprising a second transmit electrode ring and a second transmit electrode line, and a first transmit electrode shield. A portion of the conductive nib is in the nib holder, and the conductive spring electrically connects the conductive nib and the nib holder to the circuit. The second transmit electrode line electrically connects the second transmit electrode ring to the circuit, the second transmit electrode ring surrounds one end of the first transmit electrode opposing to a tip of the conductive nib. The first transmit electrode shield surrounds the nib holder and is configured to be located between the first transmit electrode and the second transmit electrode, the first transmit electrode shield sheaths the first transmit electrode to shield the first transmit electrode so that only a portion of the first transmit electrode adjacent the tip of the conductive nib exposes and the portion of the first transmit electrode and the second transmit electrode ring is apart with a distance.

In one embodiment of the present invention, the capacitive stylus with two transmit electrodes comprises a circuit board with a circuit thereon, a first transmit electrode comprising a conductive nib, a nib holder and a conductive spring, a second transmit electrode comprising a second transmit electrode ring and a second transmit electrode line, a first transmit electrode shield and an insulation shield covering the first transmit electrode shield. A portion of the conductive nib is in the nib holder, and the conductive spring electrically connects the conductive nib and the nib holder to the circuit. The second transmit electrode line electrically connects the second transmit electrode ring to the circuit, the second transmit electrode ring surrounds a first end of the first transmit electrode opposing to a tip of the conductive nib. The first transmit electrode shield surrounds portions of the conductive nib, the nib holder and the conductive spring to shield the first transmit electrode so that only a second end of the first transmit electrode adjacent the tip of the conductive nib exposes, and the second end of the first transmit electrode and the second transmit electrode ring is spaced with a distance. The insulation shield and the first transmit electrode shield are configured to be located between the first transmit electrode and the second transmit electrode, the second transmit electrode surrounds portions of the insulation shield and the first transmit electrode shield.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

FIG. 1A to FIG. 1F are schematic structural views of multiple components of a capacitive stylus with two transmit electrodes according to one embodiment of the invention. In the embodiment shown in FIG. 1A to FIG. 1F, several features which are not essential to the claimed invention and are well known and enabled to practice for anyone with ordinary skill in the art are omitted, such as stylus tube, buttons and power source, etc.

Figure 1A:
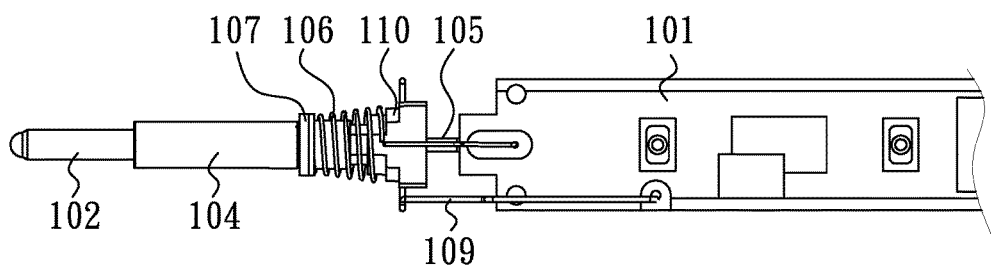
FIG. 1A to FIG. 1F are schematic structural views of multiple components of a capacitive stylus with two transmit electrodes according to one embodiment of the invention.

FIG. 1A shows a basic structure of a capacitive stylus 100 according to one embodiment of the invention. The basic structure of the capacitive stylus 100 shown in FIG. 1A comprises a capacitive stylus circuit board 101, a conductive nib 102, a nib holder 104, a first transmit electrode ground line 105, a conductive spring 106, a second transmit electrode line 109, a tip pressure sensor holder 110 and an insulated muffle O-ring 107. The tip of the conductive nib 102 is preferably made of wear resistant soft materials. The nib holder 104 is conductive and is made of conductive materials. The nib holder 104 sheaths or surrounds a portion of the conductive nib 102 and penetrates the conductive spring 106 to contact with the tip pressure sensor holder 110. The conductive spring 106 surrounds a portion of the nib holder 104 and connects the nib holder 104 to a circuit on the capacitive stylus circuit board 101. One end of the second transmit electrode line 109 is configured to be formed a half circle which surrounds the tip pressure sensor holder 110, while the other end of the second transmit electrode line 109 electrically connects to the circuit on the capacitive stylus circuit board 101. The first transmit electrode ground line 105 is made of any suitable conductive materials. The insulated muffle O-ring 107 is configured to be located on the nib holder 104. More details about the features of the first transmit electrode ground line 105, the conductive spring 106 and the second transmit electrode line 109 of the embodiment will be further described in the following contents.

Figure 1B:
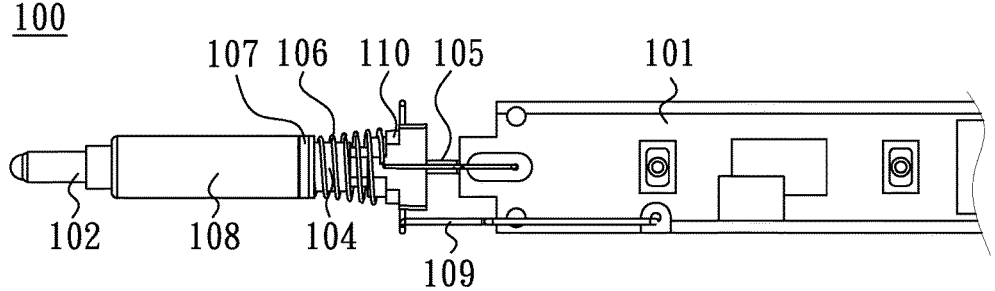

FIG. 1B shows the basic structure of a capacitive stylus 100 further comprising a first transmit electrode shield 108 according to one embodiment of the invention. The first transmit electrode shield 108 is made of conductive materials and connects with the first transmit electrode ground line 105. However, all the surfaces of the first transmit electrode shield 108 except the portion connecting to the first transmit electrode ground line 105 are insulated via suitable insulation treatments, such as covering with insulation coating, insulation film and insulated oxide layer by anodizing process, etc. The first transmit electrode shield 108 sheaths and surrounds a large portion of the conductive nib 102 and the nib holder 104. The insulated muffle O-ring 107 is configured to be located between one end of the first transmit electrode shield 108 and the conductive spring 106. The first transmit electrode ground line 105 connects the first transmit electrode shield 108 to a second rear shield 118 shown in FIG. 1E. The first transmit electrode ground line 105 connects to ground via connecting the second rear shield 118 to the capacitive stylus circuit board 101. The conductive nib 102, the nib holder 104 and the conductive spring 106 constitute a first transmit electrode (Tx1). The first transmit electrode is shielded by the first transmit electrode shield 108 so as to prevent signal interference between the first transmit electrode and a second transmit electrode (Tx2) constituted by a second transmit electrode ring 112 shown in FIG. 1C and the second transmit electrode line 109.

Figure 1C:
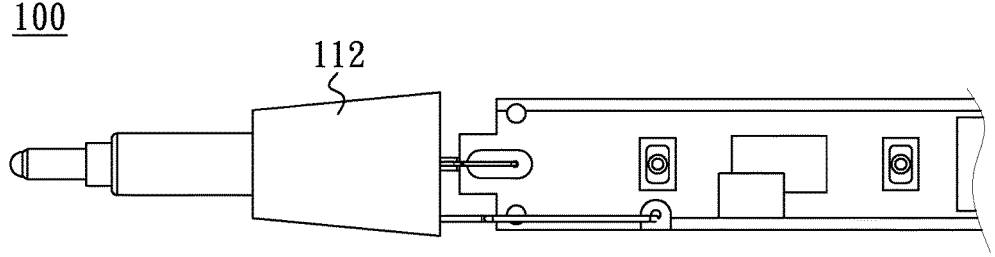

FIG. 1C shows the basic structure of a capacitive stylus 100 further comprising a second transmit electrode ring 112 according to one embodiment of the invention. The second transmit electrode ring 112 is made of conductive materials. As shown in FIGS. 1A and 1B, the end of the second transmit electrode line 109 being configured to be formed a half circle and surrounding the tip pressure sensor holder 110 electrically connects the second transmit electrode ring 112 to the circuit on the capacitive stylus circuit board 101. The second transmit electrode ring 112 and the second transmit electrode line 109 constitute the second transmit electrode (Tx2).

Figure 1D:
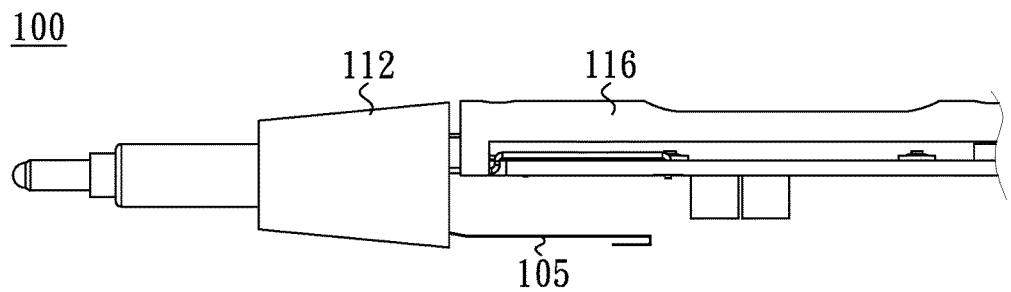
Figure 1E:
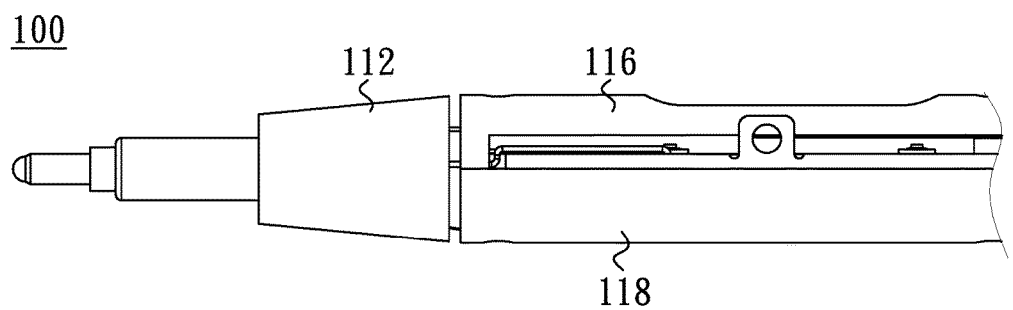
Figure 1F:
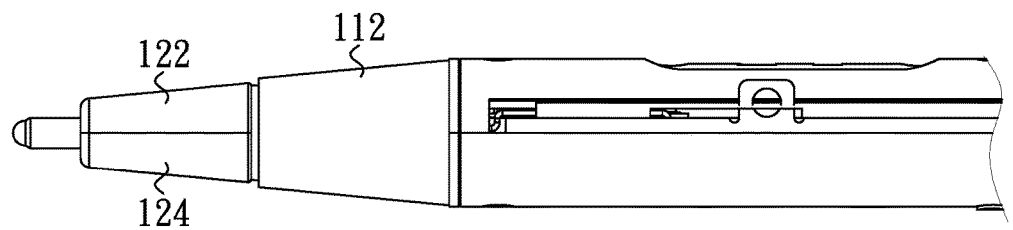

FIG. 1D shows the basic structure of a capacitive stylus 100 further comprising a first rear shield 116 according to one embodiment of the invention. The first rear shield 116 is made of conductive materials. FIG. 1E shows the basic structure of a capacitive stylus 100 further comprising a second rear shield 118 according to one embodiment of the invention. The second rear shield 118 is made of conductive materials. The first transmit electrode ground line 105 connects with the first transmit electrode shield 108 and the second rear shield 118, and connects to ground via connecting the second rear shield 118 to the capacitive stylus circuit board 101. FIG. 1F shows the basic structure of a capacitive stylus 100 further comprising a first frame 122 and a second frame 124 according to one embodiment of the invention. The first and second frames 122 and 124 are configured to combine, surround and secure the capacitive stylus circuit board 101, the first transmit electrode shield 108, the conductive spring 106 and the tip pressure sensor holder 110. The second transmit electrode ring 112, the first rear shield 116 and the second rear shield 118 surround a portion of the first and second frames 122 and 124.

The first transmit electrode (Tx1) constituted by the conductive nib 102, the nib holder 104 and the conductive spring 106 is shielded by the first transmit electrode shield 108 so as to prevent signal interference between the first transmit electrode and the second transmit electrode (Tx2) constituted by the second transmit electrode ring 112 and the second transmit electrode line 109. Since the first transmit electrode shield 108 almost completely sheaths the conductive nib 102 and the nib holder 104 except the tip frond end of the conductive nib 102, the distance between the first transmit electrode (Tx1) and the second transmit electrode (Tx2) is thus configured to increase. The distance between the first transmit electrode (Tx1) and the second transmit electrode (Tx2) relates to the calculation of incline angle of the capacitive stylus. That is, a properly increased distance between the first transmit electrode (Tx1) and the second transmit electrode (Tx2) is beneficial to calculation of incline angle of the capacitive stylus.

FIG. 2A to FIG. 2G are schematic structural views of multiple components of a capacitive stylus with two transmit electrodes according to another embodiment of the invention. In the embodiment shown in FIG. 2A to FIG. 2G, several features which are not essential to the claimed invention and are well known and enabled to practice for anyone with ordinary skill in the art are also omitted.

Figure 2A:
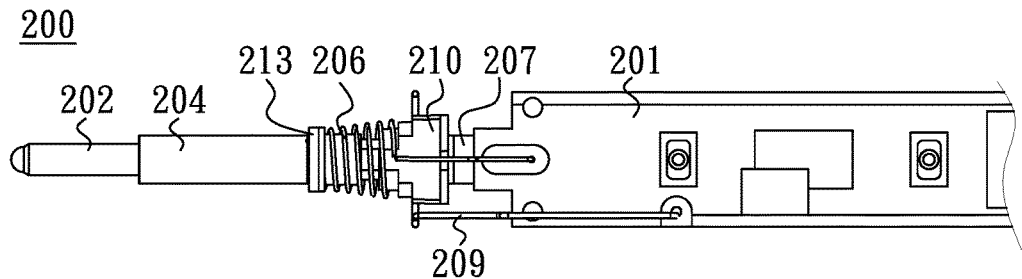
FIG. 2A to FIG. 2G are schematic structural views of multiple components of a capacitive stylus with two transmit electrodes according to another embodiment of the invention.

FIG. 2A shows a basic structure of a capacitive stylus 200 according to one embodiment of the invention. The basic structure of the capacitive stylus 200 shown in FIG. 2A comprises a capacitive stylus circuit board 201, a conductive nib 202, a nib holder 204, a conductive spring 206, a conductive line 207, a second transmit electrode line 209, a tip pressure sensor holder 210 and an insulated muffle O-ring 213. The tip of the conductive nib 202 is preferably, but not limited to, made of wear resistant soft materials. The nib holder 204 is conductive and is made of conductive materials. The nib holder 204 sheaths or surrounds a portion of the conductive nib 202 and penetrates the conductive spring 206 to contact with the tip pressure sensor holder 210. The conductive spring 206 surrounds a portion of the nib holder 204 and connects the nib holder 204 to a circuit on the capacitive stylus circuit board 201. One end of the second transmit electrode line 209 is configured to be formed a half circle which surrounds the tip pressure sensor holder 210, while the other end of the second transmit electrode line 209 electrically connects to the circuit on the capacitive stylus circuit board 201. The insulated muffle O-ring 213 is configured to be located on the nib holder 204. The conductive line 207 comprises a flexible flat cable. The conductive line 207 is configured to connect a tip pressure sensor in the tip pressure sensor holder 210 to the circuit on the capacitive stylus circuit board 201.

Figure 2B:
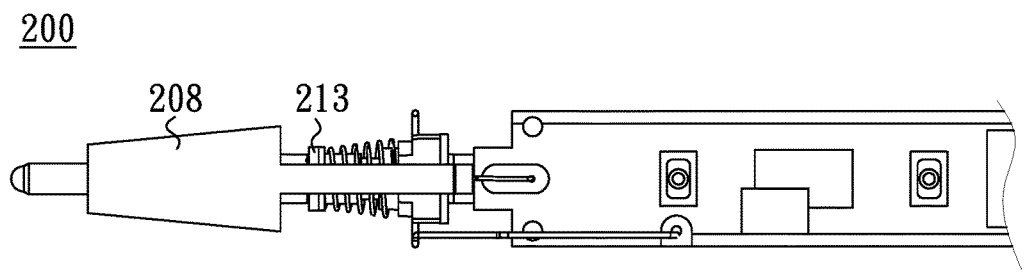

FIG. 2B shows the basic structure of a capacitive stylus 200 further comprising a first transmit electrode shield 208 according to one embodiment of the invention. The first transmit electrode shield 208 is made of conductive materials and connects to a first rear shield 216. The first transmit electrode shield 208 connects a second rear shield 218 through the first rear shield 216. The first transmit electrode shield 208 connects to ground via the first rear shield 216 and the second rear shield 218. The first transmit electrode shield 208 sheaths and surrounds a large portion of the conductive nib 202 and the nib holder 204. The conductive nib 202, the nib holder 104 and the conductive spring 206 constitute a first transmit electrode (Tx1).

Figure 2C:
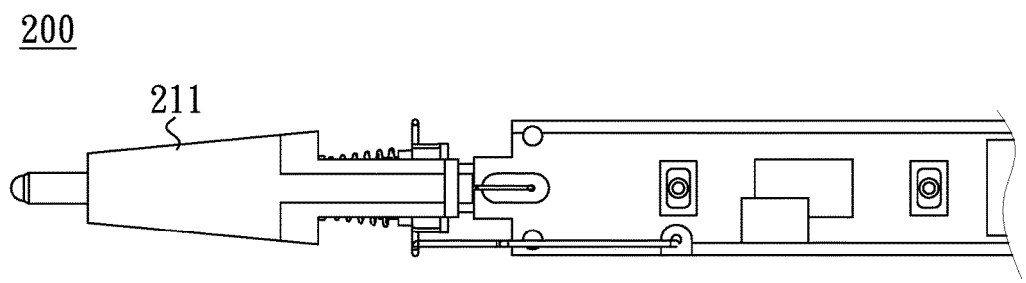

FIG. 2C shows the basic structure of a capacitive stylus 200 further comprising an insulation shield 211 according to one embodiment of the invention. The insulation shield 211 must cover the first transmit electrode shield 208 and thus the preferable dimension of the insulation shield 211 is larger than that of the first transmit electrode shield 208. The material of the insulation shield 211 comprises, but not limited to, polyester materials, such as Mylar. The insulation shield 211 can be replaced with insulation treatments on the first transmit electrode shield 208.

Figure 2D:
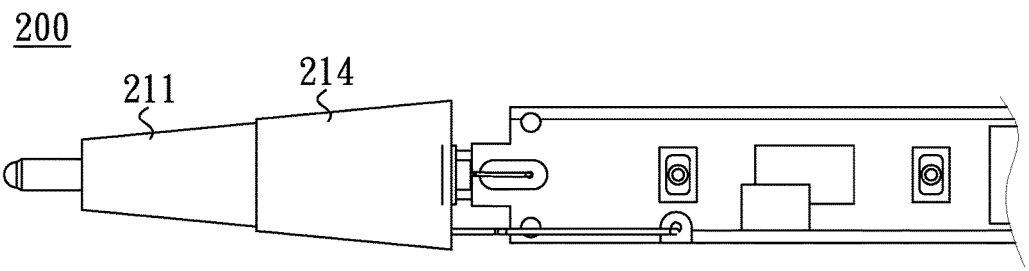

FIG. 2D shows the basic structure of a capacitive stylus 200 further comprising a second transmit electrode ring 214 according to one embodiment of the invention. The second transmit electrode ring 214 is made of conductive materials. As shown in FIGS. 2A and 2C, the end of the second transmit electrode line 209 being configured to be formed a half circle and surrounding the tip pressure sensor holder 210 electrically connects the second transmit electrode ring 214 to the circuit on the capacitive stylus circuit board 201. The second transmit electrode ring 214 and the second transmit electrode line 209 constitute the second transmit electrode (Tx2). The first transmit electrode shield 208 and the second transmit electrode ring 214 are isolated by the insulation shield 211.

Figure 2E:
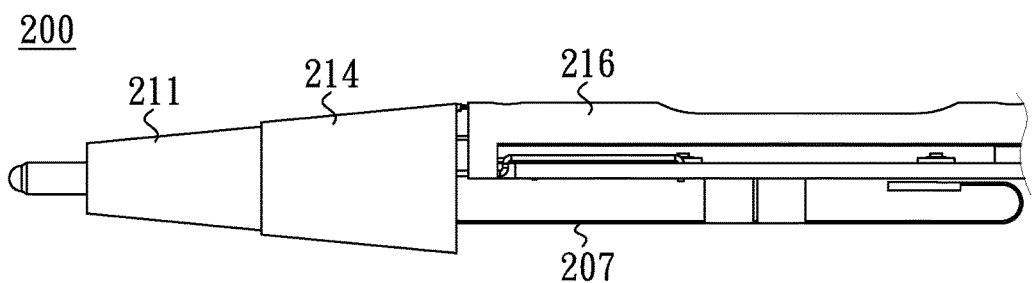
Figure 2F:
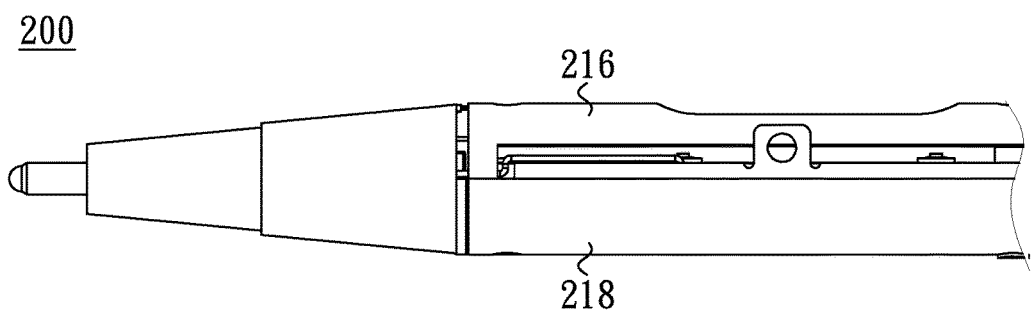
Figure 2G:
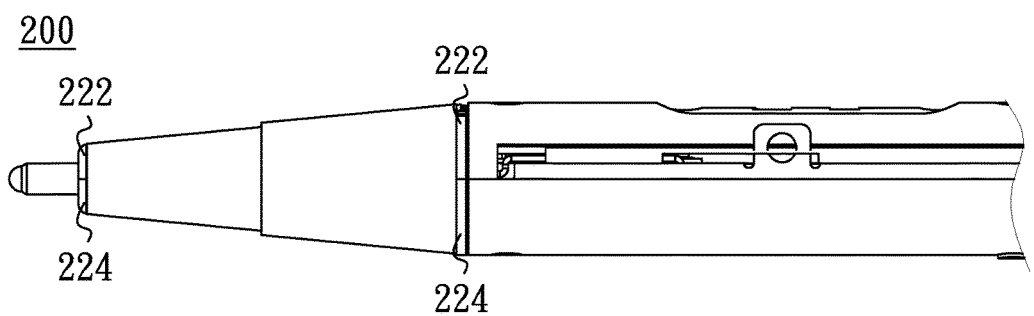

FIG. 2E shows the basic structure of a capacitive stylus 200 further comprising a first rear shield 216 according to one embodiment of the invention. The first rear shield 216 is made of conductive materials. FIG. 2F shows the basic structure of a capacitive stylus 200 further comprising a second rear shield 218 according to one embodiment of the invention. The second rear shield 218 is made of conductive materials. FIG. 2G shows the basic structure of a capacitive stylus 200 further comprising a first frame 222 and a second frame 224 according to one embodiment of the invention. The first and second frames 222 and 224 are configured to combine, surround and secure the capacitive stylus circuit board 201, the conductive spring 206 and the tip pressure sensor holder 210. The first transmit electrode shield 208, the insulation shield 211, the second transmit electrode ring 214, the first rear shield 216 and the second rear shield 218 surround a portion of the first and second frames 222 and 224.

The first transmit electrode (Tx1) constituted by the conductive nib 202, the nib holder 204 and the conductive spring 206 is shielded by the first transmit electrode shield 208 so as to prevent signal interference between the first transmit electrode and the second transmit electrode (Tx2) constituted by the second transmit electrode ring 214 and the second transmit electrode line 209. Since the first transmit electrode shield 208 almost completely sheaths the conductive nib 202 and the nib holder 204 except the tip frond end of the conductive nib 202, the distance between the first transmit electrode (Tx1) and the second transmit electrode (Tx2) is thus configured to increase which is beneficial to calculation of incline angle of the capacitive stylus.

Comparing to the capacitive stylus 100 with two transmit electrodes shown in FIG. 1A to FIG. 1F, the first transmit electrode shield 208 of the capacitive stylus 200 with two transmit electrodes shown in FIG. 2A to FIG. 2G surrounds a portion of the first and second frames 222 and 224, while the first transmit electrode shield 108 of the capacitive stylus 100 is covered and surrounded by the first and second frames 122 and 124

When a capacitive stylus is applied to contact or hover over a touch panel, the conductive tip of the capacitive stylus, the capacitive detection array of the touch panel, and the capacitive stylus will establish capacitive coupling, and capacitance of the capacitive detection array will alter due to the capacitance between the capacitive stylus and the touch panel. The detection circuit of the touch panel can receives data including coordinates and incline angle through scanning detection electrodes. The distance between signals formed on the capacitive detection array of the touch panel by the first transmit electrode (Tx1) and the second transmit electrode (Tx2) will increase as the distance between the first transmit electrode (Tx1) and the second transmit electrode (Tx2). In the embodiments of the claimed invention, by increasing the distance between the first transmit electrode (Tx1) and the second transmit electrode (Tx2), the signals formed by the first transmit electrode (Tx1) and the second transmit electrode (Tx2) can maintain apart with a relative distance from each other without being too close even if the capacitive stylus is nearly perpendicular to or at 90 degree incline angle relative to the touch panel so that the touch panel can detect the incline angle more easily.

Although specific embodiments have been illustrated and described, it will be appreciated by those skilled in the art that various modifications may be made without departing from the scope of the present invention, which is intended to be limited solely by the appended claims.

What is claimed is:

1. A capacitive stylus with two transmit electrodes, comprising:
   a circuit board with a circuit thereon;
   a first transmit electrode comprising a conductive nib, a nib holder and a conductive spring, wherein a portion of the conductive nib is in the nib holder, and the conductive spring electrically connects the conductive nib and the nib holder to the circuit;
   a second transmit electrode comprising a second transmit electrode ring and a second transmit electrode line, wherein the second transmit electrode line electrically connects the second transmit electrode ring to the circuit, the second transmit electrode ring surrounds one end of the first transmit electrode opposite to a tip of the conductive nib; and
   a first transmit electrode shield, wherein the first transmit electrode shield surrounds the nib holder and is configured to be located between the first transmit electrode and the second transmit electrode, the first transmit electrode shield sheaths the first transmit electrode to shield the first transmit electrode so that only a portion of the first transmit electrode adjacent the tip of the conductive nib is exposed and the portion of the first transmit electrode and the second transmit electrode ring is spaced with a distance.

2. The capacitive stylus according to claim 1 further comprising a first frame and a second frame being configured to combine, surround and secure the circuit board, the nib holder and the first transmit electrode shield, wherein the second transmit electrode ring is outside the first and second frames.

3. The capacitive stylus according to claim 2, wherein the first transmit electrode shield is outside the first and second frames.

4. The capacitive stylus according to claim 2 further comprising a first rear shield and a second rear shield, wherein the first rear shield and the second rear shield surround the circuit board the first and second frame.

5. The capacitive stylus according to claim 4 further comprising a first transmit electrode ground line, wherein the first transmit electrode ground line connects the first transmit electrode shield to the second rear shield.

6. The capacitive stylus according to claim 1, wherein the conductive spring surrounds one end of the nib holder opposite to the tip of the conductive nib.

7. A capacitive stylus with two transmit electrodes, comprising:
    a circuit board with a circuit thereon;
    a first transmit electrode comprising a conductive nib, a nib holder and a conductive spring, wherein a portion of the conductive nib is in the nib holder, and the conductive spring electrically connects the conductive nib and the nib holder to the circuit;
    a second transmit electrode comprising a second transmit electrode ring and a second transmit electrode line, wherein the second transmit electrode line electrically connects the second transmit electrode ring to the circuit, the second transmit electrode ring surrounds a first end of the first transmit electrode opposite to a tip of the conductive nib;
    a first transmit electrode shield, wherein the first transmit electrode shield surrounds portions of the conductive nib, the nib holder and the conductive spring to shield the first transmit electrode so that only a second end of the first transmit electrode adjacent the tip of the conductive nib is exposed, and the second end of the first transmit electrode and the second transmit electrode ring is spaced with a distance; and
    an insulation shield covering the first transmit electrode shield, wherein the insulation shield and the first transmit electrode shield are configured to be located between the first transmit electrode and the second transmit electrode, the second transmit electrode surrounds portions of the insulation shield and the first transmit electrode shield.

8. The capacitive stylus according to claim 7 further comprising a first frame and a second frame being configured to combine, surround and secure the circuit board, the nib holder and the conductive spring, and the insulation shield, wherein the first transmit electrode shield and the second transmit electrode ring are outside the first and second frames.

9. The capacitive stylus according to claim 8 further comprising a first rear shield and a second rear shield, wherein the first rear shield and the second rear shield surround the circuit board the first frame and second frame.

10. The capacitive stylus according to claim 7, wherein the conductive spring surrounds one end of the nib holder opposite to the tip of the conductive nib.

11. The capacitive stylus according to claim 7, wherein the first transmit electrode shield and the conductive spring surround the nib holder.

* * * * *